Jan. 31, 1967          E. R. SCHICKLE          3,301,380
APPARATUS FOR REMOVING BEER KEGS FROM A CONVEYOR AND
ACCUMULATING THE KEGS IN GROUPINGS
FOR STORAGE THEREOF
Filed Feb. 11, 1966                    5 Sheets-Sheet 1

FIG. I.

INVENTOR.
ERNST R. SCHICKLE
BY:
ATTORNEY

INVENTOR
ERNST R. SCHICKLE
BY
ATTORNEY

FIG. 7.

United States Patent Office 3,301,380
Patented Jan. 31, 1967

3,301,380
APPARATUS FOR REMOVING BEER KEGS FROM A CONVEYOR AND ACCUMULATING THE KEGS IN GROUPINGS FOR STORAGE THEREOF
Ernst R. Schickle, Tappan, N.Y., assignor to Rheingold Breweries, Inc., Brooklyn, N.Y., a corporation of New York
Filed Feb. 11, 1966, Ser. No. 526,768
18 Claims. (Cl. 198—33)

This invention relates generally to the handling of beer kegs or barrels in a brewery, and is particularly directed to apparatus for removing beer kegs from a conveyor and accumulating the removed kegs in multi-row, readily transportable, pallet-sized groupings for storage or other handling thereof, for example, as in a keg handling system as described in my copending application Serial No. 526,784, filed February 11, 1966.

In the usual operation of a brewery, empty kegs are returned to the brewery in varying quantities during limited and random time periods which cannot be correlated with the necessary continuous keg washing and refilling operations. Further, it is economically desirable that trucks or other conveyances returning empty kegs to the brewery be unloaded and moved away from the unloading docks or bays without delay. Thus, at certain periods, for example, when the rate at which empty kegs are being unloaded from trucks is greater than the optimum rate at which kegs can be washed and refilled or racked, it is necessary to store varying quantities of the kegs as they are returned, thereby to provide a supply of stored kegs from which kegs can be removed and fed to the keg washers and rackers to permit continuous optimum operation thereof during subsequent periods when the rate of empty keg return is less than the optimum rate of operation of the washers and rackers.

Similarly, trucks being loaded with filled kegs must be moved away from the docks or bays without delay and the rate of loading of the trucks cannot be correlated with the continuous refilling or racking operation. Thus, at certain periods, it is necessary to store varying quantities of the kegs as they are refilled or racked.

It is desirable that the kegs being conveyed from the trucks to the keg washers, or from the rackers to the cold room for loading on the trucks or for placement in storage, be disposed in prone positions on the conveyors provided for such purposes so as to facilitate the movement and the routing of the kegs. However, the kegs are preferably arranged in erect positions, that is, standing on ends thereof, for transport in multi-row, pallet-sized groupings, as by a fork lift-truck, either into storage or into trucks being loaded with kegs, so that such groupings will occupy a minimum floor space and can be stacked.

It is an object of this invention to provide apparatus for removing kegs in prone positions from a conveyor transporting the same and for accumulating the removed kegs in erect positions in a plurality of rows from which readily transportable pallet-sized groupings can be withdrawn.

Another object is to provide apparatus of the described character in association with a conveyor which, for example, carries the kegs to one or more keg washers, and wherein the apparatus operates automatically to remove kegs from the conveyor in advance of the keg washer or washers when the rate at which kegs are delivered to the conveyor, for example, from trucks returning empty kegs to the brewery, substantially exceeds the optimum rate at which the washer or washers can receive kegs from the conveyor.

Still another object is to provide apparatus of the described character disposed to remove kegs from the associated conveyor in advance of a terminal section thereof leading, for example, to a keg washer or washers, and having controls for effecting operation of the apparatus in response to the presence of an excess number of kegs on such terminal section of the conveyor.

In accordance with an aspect of this invention, a conveyor transporting a single file of kegs in prone positions has keg removing means disposed adjacent thereto and operable to remove kegs in prone positions from the conveyor for reception by upending means operative to deposit the kegs in erect positions in multiple parallel rows on a second conveyor which accumulates the erect kegs in multi-row, readily transportable pallet-sized groupings.

In one embodiment of the invention, an individual keg upending device is provided for each row in which kegs are to be arranged on the second conveyor and receives kegs from a respective keg removing device disposed adjacent the first conveyor, and the keg removing devices are operated in a predetermined sequence to ensure the accumulation of substantially uniform numbers of kegs in the multiple rows on the second conveyor.

Further objects and advantages of the keg removing and grouping apparatus of this invention will be apparent in the following detailed description of an illustrative embodiment thereof which is to be read in connection with the accompanying drawings in which.

Figure 1:
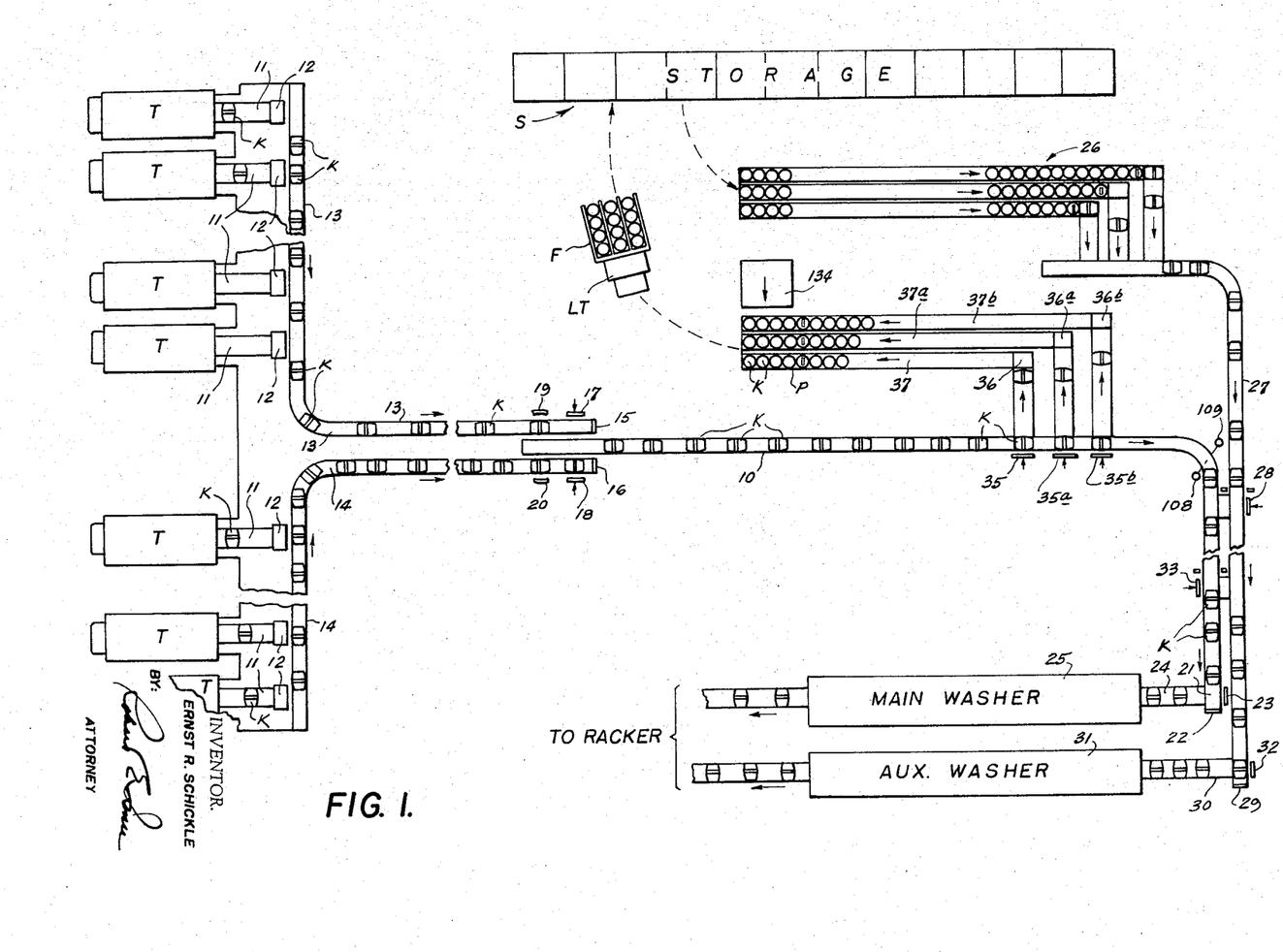
FIG. 1 is a diagrammatic view illustrating a keg handling system in a brewery in connection with which a keg removing and grouping apparatus embodying the present invention is adapted to be used.

Referring to the drawings in detail, and initially to FIG. 1 thereof, a keg removing and grouping apparatus in accordance with this invention is there shown as part of a schematically illustrated keg handling system and operates generally to remove the kegs in prone position from a main conveyor 10, upend them and accumulate them on a platform P in upright position in a multi-row, pallet-sized grouping for them to be readily transported by a conventional fork-lift truck LT and stacked in a storage area S.

In the keg handling system shown on FIG. 1 and which is described in detail in my copending application Serial No. 526,874, filed February 11, 1966, empty kegs are returned to the brewery by trucks T from which the kegs are unloaded by being rolled down unloading conveyors 11 and transferred by automatic keg feeders 12 onto receiving conveyors 13 and 14 which respectively transport the kegs axially in prone position in the directions indicated by arrows. The automatic keg feeders 12 are of the type disclosed in U.S. patent application Serial No. 456,187, filed May 17, 1965 by Ernest Schickle, and operate to transfer the kegs one at a time into available spaces on the receiving conveyors 13, 14.

As shown, the receiving conveyors extend past loading platforms in back of the trucks T to a central point at which they turn into parallel paths so that the terminal portions of receiving conveyors 13, 14 are parallel to and closely adjacent the main conveyor 10 for a short distance at opposite sides of the main conveyor. The terminal ends of conveyors 13 and 14 have abutments 15 and 16 thereacross and as kegs are carried against the abutments by the conveyors, kegs are rolled onto the main conveyor 10, alternately from the conveyors 13 and 14 by the sequential operation of keg pushing devices 17 and 18 and keg gripping devices 19 and 20 associated respectively with conveyors 13 and 14. Thus, the two lines of kegs from receiving conveyors 13 and 14 are merged smoothly into one line or pile of kegs on main conveyor 10 with a predetermined spacing between the kegs. The switching controls by which this merging is accomplished automatically are described in detail in the above mentioned companion application.

The main conveyor 10 carries the kegs K in an axial prone position to a terminal point 21 at which the kegs come up against an abutment 22 across the end of the conveyor and are pushed laterally by a keg pushing device 23 onto a feed conveyor 24 which carries the kegs through a main washer 25, from which they are moved directly to rackers (not shown) where they are filled. The keg pushing device 23, which is similar to the keg pushing devices 17 and 18 operates in conjunction with the feed conveyor 24 to feed kegs arriving at the terminal point 21 to the washer at the optimum rate of operation of the washer 25. If the rate at which kegs are being unloaded and conveyed to main washer 25 by main conveyor 10 is less than the optimum rate of operation of the washer, multi-row, pallet-sized groupings of empty kegs are withdrawn from storage S and transferred by an apparatus indicated generally at 26 onto an auxiliary conveyor 27. The apparatus 26 may be of the type described in detail in my copending application Serial No. 526,831, filed February 11, 1966, operates to separate the erect kegs from the groupings thereof and to deposit the separated kegs in prone positions in the conveyor 27 which carries them in a path parallel to the terminal section of main conveyor 10. Kegs may be transferred from conveyor 27 to conveyor 10 by a keg pushing device 28 to increase the number of kegs being carried to the main washer 25 by main conveyor 10.

In the system shown in FIG. 1, the auxiliary conveyor 27 extends beyond the keg pushing device 28 to a terminal abutment 29 adjacent a feed conveyor 30 to an auxiliary washer 31. When washer 31 is operated, kegs removed from storage and loaded onto auxiliary conveyor 27 may be carried past keg pushing device 28 to the terminal point 29 at which they are laterally pushed onto feed conveyor 30 by a keg pushing device 32 to be carried through the auxiliary washer 31 and filled at rackers provided beyond the auxiliary washer. Alternatively, kegs may be transferred from main conveyor 10 to auxiliary conveyor 27 by a keg-pushing device 33, as when it is desired to divide the stream of empty kegs on the main conveyor between the two washers 25 and 31 or to divert all the empty kegs through the auxiliary washer 31.

It will be apparent that the maximum rate at which the empty kegs are removed from the terminal portion of the main conveyor is the optimum rate at which they can be washed by washer 25 or auxiliary washer 31, or both, and that this rate may be exceeded by the rate at which empty kegs, returned by trucks T, are transferred to conveyor 10 from conveyors 13 and 14. Kegs then begin to back up along the terminal section of conveyor 10 and this excess accumulation of kegs is relieved, in order to permit the continued unloading of empty kegs from trucks T, by removing kegs from conveyor 10 by operation of the keg removing and grouping apparatus of this invention.

The apparatus of this invention comprises generally at least one keg removing device 35 adjacent the main conveyor 10 for selectively removing kegs therefrom at a point upstream from the terminal section of the main conveyor; a keg upending device 36 that receives kegs in prone position from each removal device 35 and upends them to upright or erect position; and an accumulating conveyor 37 that receives kegs in upright position from each upending device 36 and accumulates them in multi-row, pallet-sized grouping on a platform P to be removed therefrom and readily transported by conventional means, such as a fork-lift truck LT, into storage.

In the exemplary embodiment of the invention shown in FIGS. 1 and 2, three keg removing devices 35, 35a and 35b are spaced apart along the main conveyor 10 and, with respective associated upending device 36, 36a and 36b and accumulating conveyors 37, 37a and 37b, are operated, as subsequently described in detail, to remove kegs in sequence from the main conveyor 10 and group kegs in upright position in three parallel rows of four kegs each on the platform P.

Figures 2, 8:
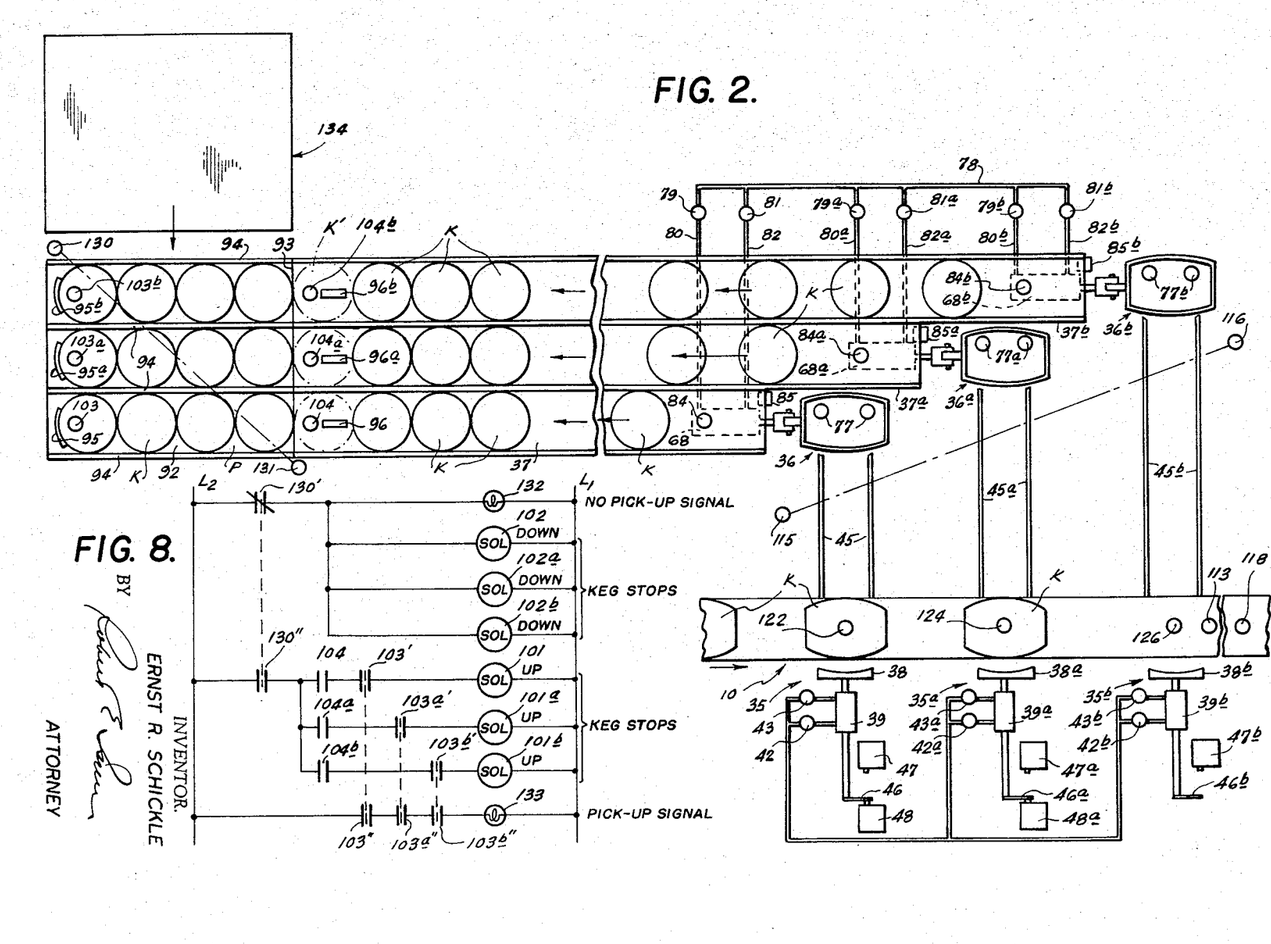
FIG. 2 is a schematic view of the keg removing and grouping apparatus embodying the present invention for use in the keg handling system of FIG. 1.
FIG. 8 is a schematic wiring diagram of the controls associated with the remainder of the elements shown in FIG. 2.
Figure 3:
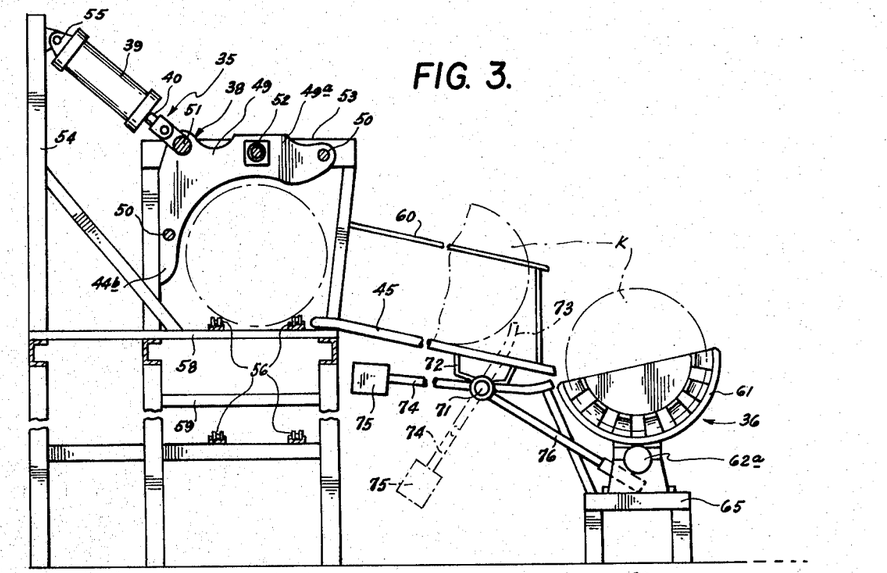
FIG. 3 is an elevational view of a keg removing device and an inclined conveyor to a keg upending device all of which comprise parts of the apparatus of the invention and showing them in their operative relation to each other and to a conveyor for kegs which is shown in cross section; the keg removing device and associated inclined conveyor being shown in side elevation and the keg upending device being shown in end elevation.
Figure 4:
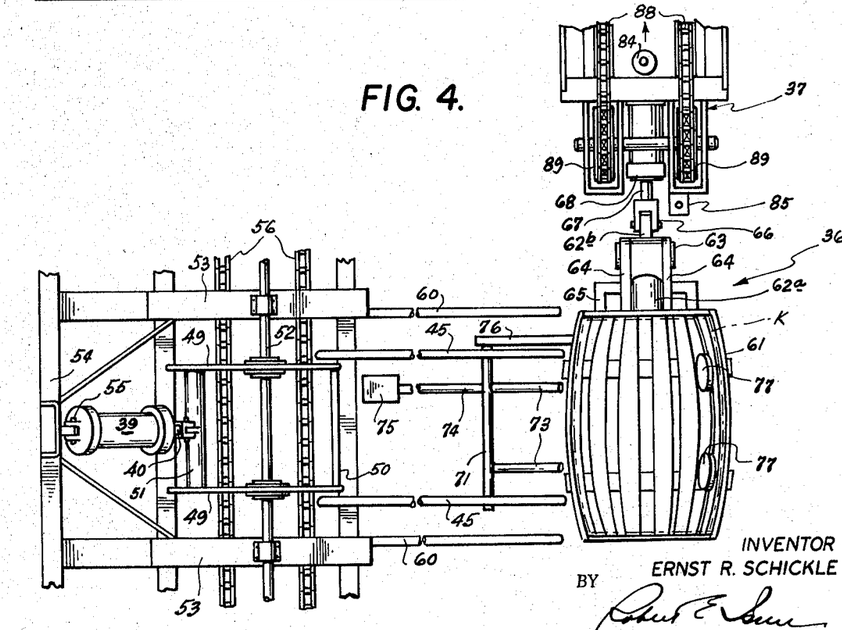
FIG. 4 is a top plan view of the elements shown in FIG. 3.

The arrangement and cooperation of the parts of keg removing devices 35, 35a and 35b and of upending devices 36, 36a and 36b are shown schematically in FIG. 2, whereas details of their structures are shown in FIGS. 3 and 4 which illustrate the structure of keg removing device 35 and upending device 36. The structures of the other two keg removing devices 35a and 35b and upending devices 36a and 36b are substantially the same as the structures shown in FIGS. 3 and 4 for devices 35 and 36 and it is to be understood that the structures described with reference to FIGS. 3 and 4 are equally applicable to the latter devices.

Referring first to FIG. 2, the keg removing device 35 is shown to comprise a pushing element 38 mounted for movement against a keg positioned laterally in line therewith on conveyor 10 by a fluid pressure operated cylinder 39 having a ram 40 connected to pushing element 38. The cylinder 39 is operated by fluid, such as air, under pressure flowing through a supply line 41 from a suitable source (not shown) and fed to the base of the cylinder through a solenoid valve 42 to move the ram and pushing element 38 outward from the cylinder and, alternately to the forward end of the cylinder through a solenoid valve 43 to return the ram and pushing element to a retracted position. The outward movement of ram 40 and keg pushing element 38 is timed by control means, subsequently to be described, to cause element 38 to engage a keg laterally in line therewith on the conveyor 10 and push the keg laterally off the conveyor onto a pair of parallel inclined rails 45. The keg then rolls down on the rails 45 to the associated keg upending device 36.

The keg removal device 35 may also include a switch actuator arm 46 movable with the ram 40 to engage and actuate a limit switch 47 when the ram 40 and attached pushing element 38 are in their outward position, and thereby initiate return of element 38 to its retracted position, as hereinafter described in detail. Valves 42 and 43 are of the type to supply fluid under pressure to the respective ends of cylinder 39 when energized and to vent the respective ends of the cylinder when deenergized. The elements of the keg removal device 35 thus far described are repeated in each of the other removal devices 35a and 35b and, on FIG. 2, such elements are indicated by the same numerals for each of the three devices, but the numerals designating the comparable elements of the removal devices 35a and 35b are followed by a and b, respectively.

As seen on FIG. 2, the keg removing devices 35 and 35a further have limit switches 48 and 48a, respectively, in positions to be actuated by the switch actuator arms 46 and 46a when the rams and pushing elements 38 and 38a are in their retracted positions.

Referring now to FIGS. 3 and 4, the pushing element 38 of keg removal device 35 is shown constituted by a pair of generally L-shaped members 49 held in spaced apart parallel relation by spacing bars 50 and 51 attached between them and pivotally mounted on a shaft 52, which is journalled through the upper arms 49a of the generally L-shaped members 49 at about the midpoint thereof. The shaft 52 is attached across frame members 53 above the path of the conveyor 10 and the outer end of the ram 40 of the cylinder 39 is pivotally connected to the spacing bar 51 that is secured between the members 49 at the elbows thereof. The base of the cylinder 39 is pivotally attached to a vertical frame member 54 by a clevis-type connection 55. Thus, the cylinder 39 and members 49 of the pushing element 38 are mounted so that outward movement of the ram 40 and pushing element from their retracted position shown in FIG. 3 pivots the pushing element 38 about the shaft 52 in the direction to cause the lower arms 49b of L-shaped members 49 to push against a keg K laterally in line therewith on the conveyor 10 and thereby roll the keg off onto inclined rails 45.

As illustrated in FIGS. 3 and 4, the main conveyor 10 may consist of a pair of endless parallel chains 56 spaced apart sufficiently to support kegs in axial prone position. The chains 56 are driven in a conventional manner by passing around sprockets (not shown) which are driven by a suitable motor (designated motor 57 on the schematic wiring diagram of FIG. 7). The upper keg supporting run of chains 56 passes over horizontal frame member 58 and the lower return runs of the chains pass over a lower horizontal frame member 59 and are supported thereon by suitable idler rollers (not shown).

The conveyor 10 thus carries the kegs K in axial prone position and when a keg is pushed laterally off the conveyor by the keg removal device 35, it rolls down the inclined rails 45 between guide rails 60 and drops into a cradle 61 of the associated keg upending device 36. As shown on FIGS. 3, 4 and 5, the cradle 61 is mounted longitudinally on the long arm 62a of a lever 62 which has a shorter arm 62b joining the long arm 62a at an angle. The lever 62 is pivotally supported on a pivot pin 63, which passes through lever 62 at the junction of the arms 62a and 62b and which is journalled between a pair of parallel upstanding supports 64 fixed on a base member 65. In the receiving position of the upending device shown in FIG. 5, the lever arm 62a and the cradle 61 carried thereon are substantially horizontal and the lever arm 62b extends downward at an angle relative to the arm 62a from the pivot 63. The lower end of arm 62b is pivotally connected by a clevis connection 66 to the ram 67 of a fluid pressure operated cylinder 68, the base end of which is pivotally connected by a clevis connection 69 to a frame member 70. When fluid pressure is applied to the cylinder 68, in the manner subsequently to be described, to move the ram 67 outward from the retracted position shown in FIG. 5, the lever arm 62b is pushed to the left and thereby swings the lever arm 62a and cradle 61 up to the vertical position, shown in dash lines, at which the keg in the cradle 61 is carried up to vertical upended or erect position and deposited on the support surface of conveyor 37.

Referring back to FIGS. 3 and 4, it will be seen that stop means is provided to prevent a keg on the inclined rails 45 from dropping off the end of the rails onto the upending device 36 except when the cradle 61 is in its horizontal keg receiving position. Such stop means comprises an axle 71 extending transversely under the rails 45 and journalled in support brackets 72 fixed to the undersides of the rails 45. Attached to and projecting from the axle 71 are a pair of parallel spaced apart stop arms 73, a balance arm 74 extending outward from the axle 71 on the opposite side of the axle from the stop arms with a weight 75 on its outer end, and a contact arm 76 with its outward end extending into the path of movement of the lever arm 62a at right angles thereto. As illustrated in full lines in FIG. 3, when the lever arm 62a and cradle 61 thereon are in their keg receiving horizontal position, the contact arm 76 is held down by the lever arm 62a and hold the axle 71 in an angular position in which the stop arms 73 are swung down below the surface of the rails 45. In this position of the stop arms 73 a keg pushed by the keg removal device 35 from the conveyor 10 onto the inclined rails 45 is free to roll down off the ends of the rails into the cradle 61. When a keg is received in the cradle 61, it is sensed or detected by proximity switches 77 therein to cause the upward swing of the lever arm 62a and cradle 61, as subsequently described. As the lever arm 62a moves upward, releasing the contact arm 76, the balance arm 74 and weight 75 are free to drop down and rotate the axle 71 until the stop arms 73 swing up above the rails 45 to the positions shown in dash line on FIG. 3 in which a keg rolling down the rails 45 comes to rest against the stop arms 73. The weight 75 is made sufficiently heavy to hold the stop arms 73 in this position against the weight of the keg or kegs on the rails. Then when the lever arm 62a moves back down to its horizontal position, it presses the contact arm 76 down so as to rotate the stop arms 73 out of the path of a keg on the rails thereby freeing the keg to roll down into the cradle 61.

Referring again to FIG. 2, it will be seen that, in the embodiment illustrated, the three keg upending devices 36, 36a and 36b are shown arranged in echelon at the similarly echelon arranged keg receiving ends of conveyors 37, 37a and 37b, and with the pairs of rails 45, 45a and 45b extending between the upending devices and the keg removing devices 35, 35a and 35b, respectively, being of progressively increasing length. Such arrangement permits the conveyors 37, 37a and 37b to extend parallel to conveyor 10 and to move in the direction opposed to the latter for the most convenient and economical utilization of the floor space adjacent conveyor 10. It will be understood that the structure and operation of the several upending devices and associated keg accumulating conveyors are similar, and though the above description refers only to elements of the upending device 36 and the following description refers only to elements of the conveyor 37, comparable elements are found in the upending devices 36a and 36b and conveyors 37a and 37b and such comparable elements are designated by the same numerals as the elements specifically described, but are followed by a and b, respectively.

The keg upending device 36 is operated to deposit a keg in erect position on conveyor 37 when fluid, such as air under pressure, from a supply line 78 is delivered through a solenoid valve 79 and feeder line 80 to the base end of cylinder 68 to move its ram 67 outward to raise lever arm 62a and cradle 61 to its vertical position. Then to retract ram 67 and thereby return cradle 61 to its horizontal keg receiving position, the fluid is directed through a solenoid valve 81 and feeder line 82 to the forward end of cylinder 68.

The solenoid valves 79 and 81 are of the type which, when energized, supply fluid under pressure to the respective ends of cylinder 68 and, when deenergized serve to vent or discharge fluid from the respective ends of the cylinder.

Figure 5:
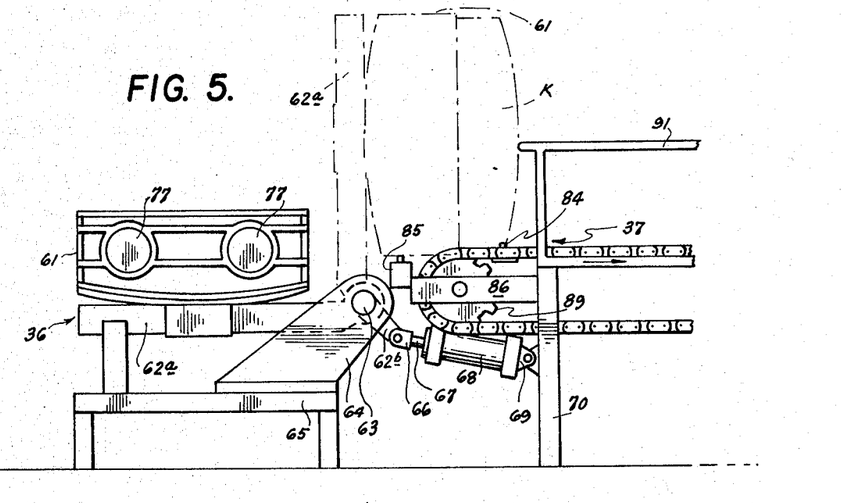
FIG. 5 is a side elevation of a keg upending device and a portion of the conveyor on which the upending device deposits kegs and showing the cradle of the device in horizontal position in full lines and in vertical position in dash lines.

As shown on FIGS. 2 and 5, a proximity switch 84 is mounted at the keg receiving end of conveyor 37 to detect the presence of a keg thereon. The controls for solenoid valve 79 are such, as subsequently described, to cause energization of valve 79 for moving cradle 61 to its vertical position only when proximity switches 77 detect a keg properly seated in the cradle and proximity switch 84 does not detect a keg at the receiving end of conveyor 37, that is, when space exists on conveyor 37 to receive a keg from upending device 36. When switch 84 indicates a space available for a keg on the receiving end of conveyor 37, and a keg is then deposited on the conveyor by the cradle, the movement of cradle 61 to vertical keg depositing position actuates a limit switch 85. In the controls subsequently described, the actuation of limit switch 85 causes return of the cradle to its horizontal keg receiving position. The limit switch 85 may be mounted on a cantilever frame member 86 projecting from the frame member 70 of conveyor 37 and is in position to be engaged and actuated by a part of cradle 61 when the cradle reaches its vertical keg depositing position shown in dash line on FIG. 5.

Figure 6:
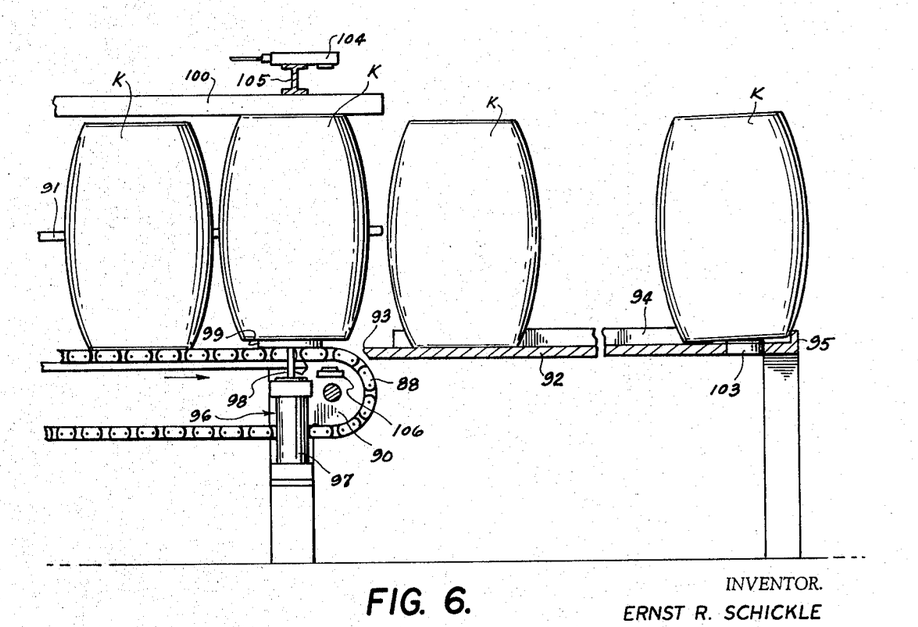
FIG. 6 is a vertical section through the accumulating platform and through the adjacent downstream end portion of the conveyor from the upending device shown in FIG. 5 and showing the keg stop at the downstream end of this conveyor in operative position.

The conveyor 37 conveys kegs received from upending device 36 (FIG. 5) in upright position in a row in the direction of the arrows, that is, toward platform P (FIG. 6). The conveyor 37 comprises a pair of parallel endless chains 88 carried around sprocket wheels 89 and 90 that are journalled in the frame of the conveyor and driven by a suitable motor. The chains 88 are spaced apart sufficiently for the kegs to be supported thereon in upright position and guide rails 91 for the kegs are provided along the sides of the path of the conveyor.

The support surface of conveyor 37 defined by the upper runs of chains 88 and the support surface formed by the top 92 of platform P are substantially horizontal and on the same level, and the downstream or discharge end of conveyor 37 is closely adjacent the receiving edge 93 of the platform top 92 so that kegs carried by chains 88 are slid off onto top 92 as the supporting chains move down around the downstream sprockets 90. The top 92 is provided with parallel guide ribs 94 extending from its receiving edge 93 to the opposite edge, and being spaced apart to define a path or alley in which a row of kegs delivered to the top 92 are moved across the top. As successive kegs are slid onto platform P by conveyor 37, the following kegs still engaged by chains 88 push against the preceding kegs to propel the kegs along platform top 92. When a predetermined number of kegs has thus been accumulated in a row on the platform top 92, the lead keg in such row engages a stop plate 95, and a keg stop 96 is actuated, as hereinafter described, to hold the keg at the downstream end of conveyor 37 in that position so that no more pressure can be applied to the kegs on the platform until the accumulated kegs are removed.

The keg stop 96 is in the nature of a fluid pressure operated lift jack between the pair of chains 88 at the downstream end of conveyor 37 and comprises a vertical cylinder 97 having a ram 98 with a support plate 99 attached across its outer end in position to be moved up between chains 88 to lift a keg from the chains and press the keg up against an overhead abutment 100, as shown in FIG. 6. The stopped keg is thus held firmly in raised position above chains 88 of the conveyor 37 which continues to operate and moves kegs up against the stopped keg until the platform is cleared of kegs— or until the conveyor 37 becomes packed with kegs in which case proximity switch 84 prevents further operation of upending device 36 for depositing kegs on conveyor 37.

The cylinder 97 is operated by fluid, such as air, under pressure supplied to the cylinder from a suitable supply line and delivered through a solenoid valve 101 (FIG. 8) to extend the ram and stop a keg; and alternatively through a solenoid valve 102 to retract the ram and release the stopped keg.

The circuits subsequently described in detail for controlling the operation of keg stop 96 include a proximity switch 103 located at the end of platform top 92 adjacent the stop plate 95 in position to detect the lead keg in a row moved into position against the stop plate, and a switch operated by a photocell 104 mounted on a frame member 105 over the position occupied by a keg on the downstream end of conveyor 37 to receive a beam of light from a light source 106 located so that a keg on the end of the conveyor interrupts the beam of light thereby causing the photocell 104 to actuate the associated switch.

Figure 7:
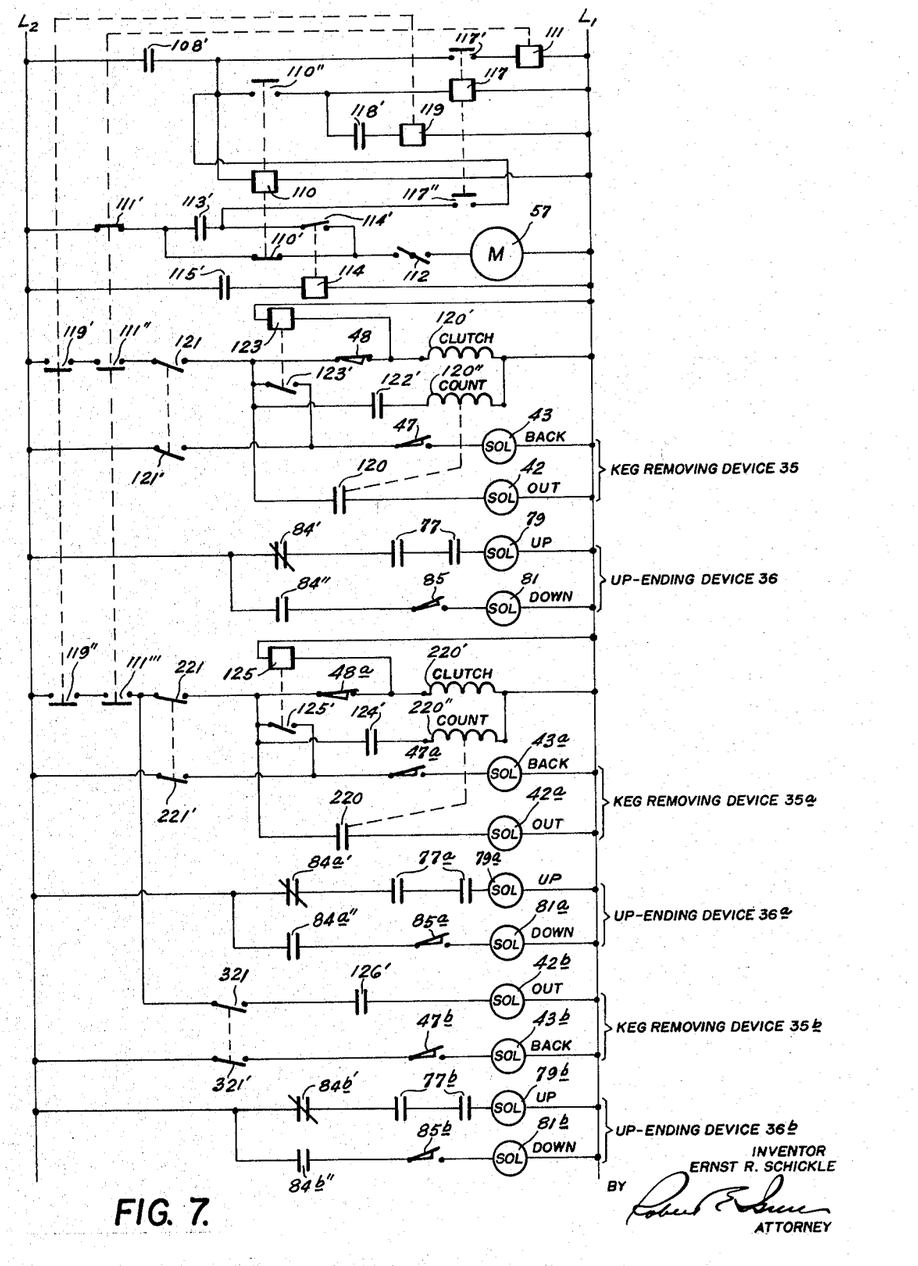
FIG. 7 is a schematic wiring diagram of the controls associated with some of the elements shown in FIG. 2.

Referring now to FIGS. 1, 2 and 7, the operation of the keg removal devices 35, 35a and 35b to selectively remove kegs from main conveyor 10 is initiated by a photocell 108 and cooperating light source 109 arranged across the main conveyor 10 between the removal point, established by the location of the keg removal devices 35, 35a, and 35b, and the terminal point 21. The photocell 108 is arranged so that kegs moving on the conveyor 10 past the photocell interrupt the beam of light from source 109 and thereby actuate a normally open switch 108' which is in series with the coil of a time delay relay 110 which is constituted, and connected as described below, to initiate operation of the keg removal devices only after the beam to the photocell 108 has been interrupted for a predetermined extended length of time. Thus, when kegs carried by main conveyor 10 are taken off at terminal point 21 at approximately the rate kegs are delivered to the upstream end by conveyors 13 and 14 so that kegs continue along conveyor 10 at regularly spaced intervals, the intermittent interruption of the light beam between source 109 and photocell 108 is insufficient to actuate time delay relay 110. However, when the kegs are unloaded and delivered to conveyor 10 at a rate exceeding the optimum rate of operation of the keg washer or washers, the kegs back up or move close together on the terminal section of conveyor 10 and finally cause continuous interruption of the light beam aimed at photocell 108 for a set period sufficient to trip time delay relay 110.

Referring now to the schematic wiring diagram of FIG. 7, electric power for operating the controls of the embodiment of the invention illustrated is supplied from a suitable source (not shown) by conductors designated L1 and L2.

Closing of the switch 108' for the predetermined extended period to cause tripping of time delay relay 110, effects opening of a normally closed contact 110' and closing of a normally open contact 110" of the relay. The normally closed contact 110' is interposed in series with a normally closed contact 111' of a relay 111 and a manually closed switch 112, in an energizing circuit for the motor 57 which drives the main conveyor 10. The circuit for energizing the motor 57 also includes, connected across contact 110', a normally open switch 113' actuated by a photocell 113 in series with a normally closed contact 114' of a time delay relay 114. As shown on FIG. 2, photocell 113 is disposed adjacent the main conveyor 10 at the downstream side of keg removal device 35b so that a keg moving beyond removal device 35b will interrupt a light beam directed at the photocell 113 by a light source (not shown) and thereby close the normally open switch 113' associated with photocell 113.

The energizing circuit for time delay relay 114 includes, in series with the coil of the latter, a normally open switch 115' actuated by a photocell 115. As shown in FIG. 2, a beam of light from a light source 116 is directed across the discharge or lower ends of all the three pairs of inclined rails 45, 45a and 45b at the photocell 115. Thus, if the kegs removed from main conveyor 10 jam on any one of the pairs of rails so as to cause a continuous interruption of the beam of light to photocell 115, the resulting continuous closing of the switch 115' will cause time delay relay 114 to be energized for a period sufficient to trip the latter and thereby open its normally closed contact 114'.

It will be apparent that, when time delay relay 110 trips to open contact 110′, an alternate circuit for energizing motor 57 is provided so long as photocell 113 detects a keg being carried beyond keg removing device 35b and so long as time delay relay 114 has not been tripped in response to the detection by photocell 115 of an accumulation of kegs at the discharge end of one or more of the inclined pairs of rails 45, 45a or 45b.

The closing of contact 110″ of time delay relay 110 completes a circuit (FIG. 7) through the then closed switch 108′ associated with photocell 108 for energizing a time delay relay 117 having normally open contacts 117′ and 117″. Contact 117′ is interposed in series with the switch 108′ of photocell 108 in the energizing circuit for relay 111 so that, when time delay relay 117 is tripped, or times out, relay 111 is energized to open its normally closed contact 111′ in the energizing circuit of motor 57, and to close its normally open contacts 111″ and 111‴. Contact 117″ of time delay relay 117 is interposed in series with switch 108′ and the normally closed contact 114′ of time delay relay 114 in an alternative circuit for energizing conveyor motor 57 when relay contact 111′ is open, as described above. From the above it will be apparent that motor 57 continues to operate main conveyor 10 even though an excess of kegs accumulate on its terminal section, and that main conveyor 10 is halted only when photocell 115 detects a jam or other failure to remove kegs from inclined rails 45, 45a and 45b.

As seen in FIG. 2 photocell 118, which actuates a normally open switch 118′ is disposed adjacent conveyor 10 at a location downstream with respect to photocell 113 so that a light beam directed at the photocell 118 by a light source (not shown) is interrupted by kegs moving on that section of the conveyor and thereby closes its associated switch 118′.

Looking at FIG. 7, the switch 118′ is shown in series with switch 108′ of photocell 108 and with time delay relay contact 110″ in an energizing circuit for a relay 119. Thus, when photocell 118 detects a keg, after an excess of kegs has been detected by photocell 108, relay 119 is energized to close its normally open contacts 119′ and 119″ which are connected in series with the previously mentioned contacts 111″ and 111‴.

The simultaneous closing of relay contacts 111″ and 119′ and of relay contacts 111‴ and 119″ as described above, conditions the control circuits of keg removing devices 35, 35a and 35b for effecting operation thereof.

As shown on FIG. 7, the energizing circuit for solenoid valve 42 of keg removing device 35 has interposed therein a normally open timer switch 120 in series with relay contacts 111″ and 119′ and with a manually closed switch 121. Also connected in series with relay contacts 111″ and 119′ and switch 121 are a normally closed limit switch 48 and a coil 120′ for engaging the return clutch of the timer switch 120. Further, a stepping or counting coil 120″ of the timer switch 120 connected in series with a normally open switch 122′ of a photocell 122 are disposed in parallel across switch 48 and clutch engaging coil 120′. As previously described, limit switch 48 is mounted so as to be engaged, and thereby opened by switch actuator 46 when cylinder 39 disposes keg removing device 35 in its retracted or inoperative position. Further, photocell 122 is mounted adjacent the main conveyor 10 at the location of keg removing device 35 so that, as each keg moved by the main conveyor arrives in line with the keg removing device 35, such keg interrupts a beam of light directed at photocell 122 by a light source (not shown) and thereby closes the switch 122′ of photocell 122.

So long as keg removing device 35 is in its retracted position, and thus holds limit switch 48 open, clutch coil 120′ is deenergized. Further, the timer associated with the energizing circuit for solenoid valve 42 is arranged so that timer switch 120 is closed to energize that solenoid valve, and thereby cause movement of keg removing device 35 from its retracted position to its extended position only upon three successive impulses to counting or stepping coil 120″ as a result of the interruption of the light beam aimed at photocell 122 by three successive kegs carried by the main conveyor. Thus, after the circuit for energizing solenoid valve 42 is conditioned for operation in response to the presence of an excess number of kegs on the terminal section of conveyor 10, the first and second kegs carried past keg removing device 35 by the conveyor will continue along the conveyor and only the third keg arriving at keg removing device 35 will be laterally kicked or pushed by such device for removal from the conveyor. When keg removing device 35 is moved from its retracted to its extended position for removing a keg from the conveyor, limit switch 48 will return to its normal closed position to cause energization of clutch coil 120′ which effects return of the timer to its initial or start position and thereby opens timer switch 120 so that solenoid valve 42 is thereby deenergized. In order to ensure the full return of the timer to its initial or start position even if one or both of relay contacts 111″ and 119′ opens prior to the completion of such return, an alternative circuit for energizing clutch coil 120′ is provided through a manually closed switch 121′ coupled with switch 121 and through a normally open relay contact 123′ of relay 123 disposed in series with limit switch 48. The circuit for energizing relay 123 and thereby closing its contacts 123′ is connected across clutch coil 120′ so that the initiation of energization of clutch coil 120′ as described above, also initiates energization of relay 123 which is thereafter maintained in its energized condition through the closing of relay contact 123′ until limit switch 48 is again open in response to the return of keg removing device 35 to its retracted position.

The circuit for energizing solenoid valve 43 and thereby causing return of keg removing device 35 to its retracted position has connected in series therein the manually closed switch 121′ and the normally open limit switch 47 which, as described with respect to FIG. 2, is closed by actuator 46 upon movement of keg removing device 35 to its extended or operative position.

As shown on FIG. 7, the control circuits for keg removing device 35a are generally similar to those described above for keg removing device 35 and include a normally open timer switch 220 and manually closed switch 221 connected in series with relay contacts 111‴ and 119″ in the energizing circuit of solenoid valve 42a; a clutch coil 220′ which is energized to return the timer to its initial or start position upon closing of limit switch 48a in response to the release of such limit switch by switch actuator 46a (FIG. 2) when keg removing device 35a is moved from its retracted position to its operative or extended position; and a counting or stepping coil 220″ connected in series with a normally open switch 124′ of photocell 124 and with relay contacts 111‴ and 119″ and manually closed switch 221. The timer associated with the circuit for energizing solenoid valve 42a differs from that associated with solenoid valve 42 as described above, only in that timer switch 220 is closed to effect removal from the conveyor of the second keg arriving at the location of keg removing device 35a to close the switch 124′ of photocell 124 after the detection of an excess of kegs on the terminal portion of the conveyor. When keg removing device 35a is moved from its retracted position toward its operative position, the return or reset clutch coil 220′ is energized through closed limit switch 48a which also causes energization of a relay 125 for closing contact 125′ of the latter and thereby maintaining energization of the reset clutch coil and of relay 125 through the circuit having manually closed switch 221′, relay contact 125′ and limit switch 48a in series therein until limit switch 48a is again opened upon the return of keg removing device 35a to its retracted position. Keg removing device 35a is returned to its retracted position when normally open limit switch 47a in series with the manually closed switch 221' in the energizing circuit for solenoid valve 43a is closed by switch actuator 46a in response to the arrival of keg removing device 35a at its extended position.

The control circuits for keg removing device 35b are shown to include a manually closed switch 321 and a normally open switch 126' of a photocell 126 connected in series with relay contacts 111''' and 119'' in the energizing circuit for solenoid valve 42b. Photocell 126 is mounted adjacent keg removing device 35b (FIG. 2) so that a keg on the conveyor arriving in front of removing device 36b will intercept a light beam directed at photocell 126 by a light source (not shown) and thereby effect closing of the switch 126' of the photocell 126. Thus, after an excess of kegs has been detected on the terminal section of conveyor 10, the next keg arriving at the keg removing device 35b will cause energization of solenoid valve 42b so that keg removing device 35b pushes that keg laterally off the conveyor 10 onto the inclined rails 45b. As soon as the keg has been thus removed from the conveyor the light beam aimed at photocell 126 is no longer interrupted so that switch 126' of photocell 126 will open and cause deenergization of solenoid valve 42b. The circuit for energizing solenoid valve 42b includes a manually closed switch 321' in series with the normally open limit switch 47b which is closed by switch actuator 46b in response to the movement of keg removing device 35b to its fully extended position, whereupon the energized solenoid valve 43b causes return of keg removing device 35b to its retracted position.

It will be apparent that, by reason of the above described control circuits for keg removing devices 35, 35a and 35b the detection of an excess number of kegs on the terminal section of conveyor 10 will cause the first keg which thereafter arrives at keg removing device 35 to be pushed off the conveyor by device 35b, the second keg which arrives at keg removing device 35 to be pushed off by device 35a, and the third keg which arrives at device 35 to be pushed off by the latter.

When the congestion of kegs on the terminal section of the conveyor (adjacent photocell 108) is relieved, so that switch 108' of photocell 108 is no longer continuously closed, relay 111 is deenergized to open contacts 111'' and 111''' and thereby prevent further operation of keg removing devices 35, 35a and 35b. If such opening of switch 108' of photocell 108 occurs prior to the completion of the sequential operation of keg removing devices 35b, 35a and 35, in that order, the timer of each keg removing device which has not yet operated does not return to its initial or start position. Thus when the conveyor 10 becomes congested with excess kegs again the cycle of operation of the keg removing devices will commence at the point where it was previously interrupted. If, for example, the congestion of kegs is relieved after only two kegs have been removed by the keg removal devices 35b and 35a, the next occurrence of congestion will cause keg removing device 35 to be the first to operate for removing a keg from the conveyor. It will be understood that, so long as the congestion of kegs on the conveyor 10 continues, the keg removing devices will be repeatedly operated in the sequence described until the congestion is relieved.

As previously described the keg removal devices 35, 35a and 35b operate to push kegs from the main conveyor 10 onto pairs of inclined rails 45, 45a and 45b which deposit the kegs in prone position in cradles 61, 61a and 61b of the keg upending devices 36, 36a and 36b, respectively. When the kegs are thus properly seated in the cradles they are detected by proximity switches 77, 77a and 77b in the respective cradles and initiate the upward swing of the cradles to deposit kegs in upended or erect position on conveyors 37, 37a and 37b. The cradles are swung between their horizontal keg receiving positions and their vertical keg depositing positions by means of pressure operated cylinders 68, 68a and 68b controlled by solenoid valves 79 and 81, 79a and 81a, and 79b and 81b and by limit switches 85, 85a and 85b respectively.

Referring now to FIG. 7, it will be seen that the circuit for energizing solenoid valve 79 of upending device 36 has interposed in series therein a normally closed contact 84' of proximity switch 84 and the two normally open proximity switches 77. The circuit for energizing solenoid valve 81 has interposed in series therein a normally open contact 84'' of proximity switch 84 and the normally open limit switch 85. As previously described with respect to FIG. 2, proximity switch 84 is mounted at the portion of accumulating conveyor 37 onto which a keg is delivered by upending device 36 and is operative, when a keg is detected on that portion of the conveyor, to close its normally open contact 84''. The proximity switches 77 as shown are mounted at spaced locations in the cradle 61 of upending device 36 so as to be both affected and thereby closed by a keg received and properly seated in the cradle 61 of the upending device. The normally open limit switch 85 as previously mentioned is closed by being engaged by part of the cradle 61 when the cradle is in its vertical keg delivering position. Thus a keg deposited in prone position in the cradle 61, causes closing of both series connected proximity switches 77 to complete the circuit for energizing solenoid valve 79 so long as proximity switch contact 84' remains closed to indicate that there is an available space on accumulating conveyor 37 to receive such keg. Energizing of solenoid valve 79 causes the cradle to be swung up to its vertical position to deliver a keg onto conveyor 37 in upright position. As mentioned, the movement of the cradle 61 to vertical position closes limit switch 85 and when proximity switch 84 detects the presence of the keg thus delivered onto the conveyor 37, the contact 84'' of switch 84 closes and completes the circuit for energizing solenoid valve 81 to effect the return of cradle 61 to its horizontal keg receiving position.

The circuits for controlling the operation of upending device 36a similarly include: the proximity switch 84a which has a normally closed contact 84a' and a normally open contact 84a'' and which detects the presence of a keg on accumulating conveyor 37a adjacent the infeed end of the latter; the two normally open proximity switches 77a in the cradle 61a to detect the receipt and proper seating of a keg therein; and the normally open limit switch 85a which is closed in response to the movement of the cradle 61a to its vertical keg delivering position. As shown on FIG. 7 the normally closed proximity switch contact 84a' and the normally open proximity switches 77a are interposed in series in the energizing circuit for solenoid valve 79a, and normally open proximity switch contact 84a'' and normally open limit switch 85a are interposed in series in the energizing circuit for solenoid valve 81a.

The control circuits for upending device 36b are also similar to those described above with reference to device 36 and include: proximity switch 84b having a normally closed contact 84b' and a normally open contact 84b'' the switch 84b being mounted to detect the presence of a keg at the infeed end of accumulating conveyor 37b; the two normally open proximity switches 77b in cradle 61b responsive to a keg properly received therein; and the normally open limit switch 85b which is closed in response to the movement of the cradle 61b to vertical keg delivering position. Normally closed proximity switch contact 84b' and normally open proximity switches 77b are interposed in series in the energizing circuit for solenoid valve 79b, and normally open proximity switch contact 84b'' and normally open limit switch 85b are interposed in series in the energizing circuit for solenoid valve 81b.

The above described control circuits for upending devices 36a and 36b operate in the same manner as described above with respect to the upending device 36 to upend kegs and deposit them in upright position on the accumulating conveyors 37a and 37b, respectively.

Kegs deposited on the accumulating conveyors 37, 37a and 37b are moved by the latter in parallel rows and slid onto the top 92 of platform P in upright position. As each accumulating conveyor moves successive kegs onto the platform the kegs previously deposited on the platform are pushed across it by the pressure of the successive kegs still engaged by the respective conveyor. The kegs are thus formed into rows defined by the guide ribs 94 on the platform. When the lead keg in each of the three rows moves against the stop plate 95, 95a or 95b respectively at the far edge of the platform opposite its receiving edge 93, the proximity switches 103, 103a and 103b detect the presence of the lead kegs.

In addition to proximity switches 103, 103a and 103b, the controls for keg stops 96, 96a and 96b include the photocells 104, 104a and 104b acting as normally open switches, and being disposed at the ends of the conveyors 37, 37a and 37b adjacent platform P so that, whenever a keg is disposed at the position indicated in broken lines at K' on the respective conveyor, a beam of light aimed at photocell 104, 104a or 104b is interrupted by the keg and thereby closes the switch constituted by such photocell. Further, a photocell 130 is disposed adjacent one corner of the platform P and has a beam of light aimed thereat by a light source 131 disposed at a diagonally opposed corner.

As shown in FIG. 8, photocell 130 has a normally closed contact 130' interposed in the energizing circuit for a signal lamp 132, and also in the parallel energizing circuits for solenoid valves 102, 102a and 102b which are associated with the keg stop operating cylinders 97, 97a and 97b. Thus, so long as platform P is cleared of kegs to permit photocell contact 130' to remain in its normal closed position, solenoid valves 102, 102a and 102b are energized to hold keg stops 96, 96a and 96b in their lowered inoperative positions, and signal lamp 132 is illuminated to indicate that no grouping of kegs is ready to be picked up from the platform. Photocell 130 further has a normally open contact 130" that is in series with the switch constituted by photocell 104 and proximity switch contact 103' in the energizing circuit for the solenoid 101, in series with the switch constituted by photocell 104a and proximity switch contact 103a in the energizing circuit for solenoid valve 101a, and in series with the switch constituted by photocell 104b and proximity switch contact 103b' in the energizing circuit for solenoid valve 101b. Thus, upon the completion of any row of kegs on the platform P, the light beam aimed at photocell 130 is interrupted to close contact 130" and, simultaneously, the first keg in such a completed row is detected by the proximity switch 103, 103a or 103b and the keg in the position K' on conveyor 37, 37a or 37b is detected by the photocell 104, 104a or 104b, thereby to complete the circuit for energizing the solenoid 101, 102a or 101b and causing the upward movement of the related keg stop 96, 96a or 96b.

When all of the rows of kegs on the platform are complete, proximity switch contacts 103", 103a" and 103b" which are interposed in series in an energizing circuit for a signal lamp 133 are simultaneously closed to cause illumination of the lamp 133 which is provided to indicate to the operator of a fork lift truck that a full grouping of kegs is assembled on the platform ready to be transported from the platform to a suitable storage area (S on FIG. 1).

When a complete grouping of kegs has been accumulated on the platform, a slip board, such as a suitably shaped piece of plywood, may be placed on top of the grouping of kegs—either manually or by slip board dispenser, which is indicated generally at 134 on FIGS. 1 and 2.

The complete multi-row grouping of kegs on the platform P is such that it is readily transported, for example, to the storage area S on FIG. 1, by a fork lift truck LT having a fork F with four tines spaced apart to engage the undersides of the enlarged cylindrical central portions of the kegs in the three rows of the complete grouping. Since the kegs are erect or upright in the grouping removed from the platform, they occupy a minimum space, and successive groupings are easily stacked one upon the other so that the kegs occupy a minimum floor space in storage area S.

It will be apparent that the present invention provides an automatically operating apparatus by which beer kegs being conveyed in a single file in prone position on a conveyor are removed from such conveyor and arranged in erect positions in a plurality of rows from which multi-row, readily transportable pallet-sized groupings can be withdrawn for convenient storage or other handling, such as, loading into trucks. Further, in the particular embodiment that is described above, the removal of kegs from the single file transported by the first mentioned conveyor is initiated in response to the presence of an excess number of kegs on a terminal section of such conveyor, for example, as when empty kegs are unloaded from trucks and delivered to the conveyor at a rate greater than that at which kegs are fed from the terminal of the conveyor to a keg washer or washers.

Although a particular embodiment of the invention has been described in detail herein with reference to the accompanying drawings, it is to be understood that such embodiment is merely illustrative, and that many changes and modifications may be effected therein by one skilled in the art without departing from the scope or spirit of the invention as defined in the appended claims.

What is claimed is:

1. In combination with first conveyor means for transporting a single file of kegs in prone positions, keg removing means operable to remove kegs in prone positions from said first conveyor means, second conveyor means for transporting multiple parallel rows of kegs in erect positions, and upending means to receive kegs in prone positions from said keg removing means and being operative to deposit the removed kegs in erect positions in said plurality of rows on said second conveyor means for removal from the latter in multi-row, readily transportable pallet-sized groupings.

2. The combination according to claim 1; further comprising means operating said upending means to deposit a keg in the respective row on said second conveyor means in response to the reception by said upending means of a keg in prone position from said keg removing means and the presence in said respective row on said second conveyor means of a space for the keg to be deposited thereon.

3. The combination according to claim 2; wherein said keg removing means includes a plurality of keg removing devices arranged successively along said first conveyor means to act on successive kegs in said single file, and said upending means includes individual keg upending devices for said plurality of rows arranged to receive kegs from respective keg removing devices; and further comprising means to operate said keg removing devices in a predetermined sequence so as to effect uniform distribution of the removed kegs among said rows on the second conveyor means.

4. The combination according to claim 1; further comprising an accumulating platform onto which said parallel rows of erect kegs are propelled by said second conveyor means, and means to relieve kegs in each of said rows on said platform of the propelling force of said second conveyor means when a predetermined number of kegs in said row are present on said platform.

5. The combination according to claim 1; further comprising means to operate said keg removing means in response to the presence on said first conveyor means downstream from said keg removing means of kegs in excess of a predetermined number.

6. In combination with first conveyor means for transporting a single file of kegs in prone positions to a terminal point; apparatus for removing kegs from the first conveyor means at a removal section upstream of said terminal point and accumulating them in upright positions comprising means for upending kegs received thereby in prone position, keg removing means actuatable to remove prone kegs from said first conveyor means to said upending means in prone position, second conveyor means for transporting multiple rows of kegs in upright position, said upending means being arranged and operable to upend kegs received thereby in prone position and deposit said kegs in upright position in said rows on said second conveyor means, means for operating said upending means in response to the reception thereby of each keg in prone position, and accumulating means to receive said rows of upright kegs from said second conveyor means and accumulate them in a multi-row, readily transportable, pallet-sized grouping for convenient storage and handling thereof.

7. The combination of claim 6; including means responsive to a predetermined excess of kegs between said removal section and terminal point of said first conveyor to actuate said keg removing means.

8. The combination of claim 6; in which said keg removing means includes at least one pushing element adjacent said first conveyor means adapted to be moved to engage a keg laterally in line therewith on the first conveyor means and push said keg laterally off said first conveyor means, operating means for moving the pushing element, and means responsive to a predetermined excess of kegs between said removal section and terminal point of said first conveyor means to actuate said operating means when a keg on said first conveyor means is laterally in line with said pushing element.

9. The combination of claim 6; in which said keg upending means comprises at least one cradle mounted for movement from a horizontal position, in which it is adapted to receive and support a keg in prone position, to a vertical position in which said keg is thereby deposited in upright position on said second conveyor means, and means for moving the cradle between its horizontal and vertical positions.

10. The combination of claim 9; including means for preventing the transfer of a keg to said upending means when said cradle is out of its horizontal position.

11. The combination of claim 9; in which said means for moving the cradle includes first control means responsive to a keg supported in said cradle for actuating said moving means to move the cradle to its vertical position and second control means responsive to arrival of the cradle at its vertical position for actuating the moving means to return the cradle to its horizontal postion.

12. The combination of claim 11; in which a keg deposited on said second conveyor means by movement of said cradle to its vertical position is deposited on a receiving point on a support surface of said second conveyor, and in which said first control means includes means responsive to the presence of a keg on said receiving point for preventing actuation of said moving means to move the cradle to its vertical position when a keg is on said receiving point.

13. The combination of claim 6; in which said accumulating means comprises a platform having a substantially horizontal support surface and said second conveyor means has a moving keg supporting surface with a downstream end adjacent and on a level with an edge of said platform surface whereby to successively transfer kegs in each of said rows transported on said keg supporting surface of the second conveyor means onto said platform surface, and means on said platform surface engageable by kegs on the latter to limit movement of the kegs across said platform surface by following kegs still engaged with said second conveyor means.

14. The combination of claim 13; including stop means for each of said rows operable to engage a keg in the respective row positioned on said downstream end of the supporting surface of said second conveyor means and to lift said keg and hold it in a fixed position above said supporting surface, and means for actuating said stop means in response to the presence of a predetermined number of kegs of the respective row on said platform surface.

15. The combination of claim 14; in which said stop means for each row comprises an overhead abutment and lifting means for raising the keg up off said supporting surface of the second conveyor and up against said abutment.

16. The combination of claim 14; including additional control means responsive to removal of kegs in said rows from said platform surface for releasing said stop means.

17. The combination of claim 6; wherein said means for upending kegs includes a plurality of upending devices respectively aligned with said rows and said keg removing means includes a like number of keg removing devices, the plurality of keg removing devices being spaced along and adjacent said first conveyor means for removing successive prone kegs from the first conveyor means to the respective upending devices; and further comprising control means responsive to a predetermined excess of kegs between said removal section and said terminal point of said first conveyor means to operate said plurality of keg removing devices in sequence.

18. The combination of claim 17; in which said control means includes means to cause cessation of the operation of said plurality of keg removing devices when the number of kegs between said removal section and said terminal point of said first conveyor means is less than said predetermined excess, and means operable, when said plurality of keg removing devices are again operated subsequent to a cessation of operation, to cause the operation first of the keg removing device which is next to be operated in accordance with said sequence after the operation of the keg removing device which operated last before said cessation.

No references cited.

SAMUEL F. COLEMAN, *Primary Examiner.*

M. L. AJEMAN, *Assistant Examiner.*